United States Patent

Arita et al.

Patent Number: 6,057,984
Date of Patent: May 2, 2000

[54] METHOD FOR DATA WRITING/READ-OUT USING A CONTACT START AND STOP SYSTEM

[75] Inventors: Yoji Arita; Yuzo Seo, both of Yokohama, Japan

[73] Assignee: Mitsubishi Chemical Corporation, Tokyo, Japan

[21] Appl. No.: 09/325,176

[22] Filed: Jun. 3, 1999

Related U.S. Application Data

[60] Division of application No. 09/080,361, Mar. 17, 1998, abandoned, which is a continuation-in-part of application No. 08/734,795, Oct. 23, 1996, abandoned.

[30] Foreign Application Priority Data

Oct. 25, 1995 [JP] Japan ................................ 7-300537

[51] Int. Cl.[7] .............................. G11B 5/60; G11B 5/82
[52] U.S. Cl. ........................................ 360/103; 360/135
[58] Field of Search ................................... 360/103, 135

[56] References Cited

U.S. PATENT DOCUMENTS

| | | | |
|---|---|---|---|
| 5,062,021 | 10/1991 | Ranjan et al. ....................... | 360/135 |
| 5,166,006 | 11/1992 | Lal et al. ............................ | 360/135 |
| 5,504,646 | 4/1996 | Tanaka et al. ....................... | 360/135 |
| 5,520,981 | 5/1996 | Yang et al. .......................... | 360/135 |
| 5,550,696 | 8/1996 | Nguyen .............................. | 360/135 |
| 5,586,040 | 12/1996 | Baumgart et al. .................... | 360/135 |
| 5,674,582 | 10/1997 | Eltoukhy et al. .................... | 428/65.4 |
| 5,958,542 | 9/1999 | Ootake et al. ....................... | 428/65.3 |

FOREIGN PATENT DOCUMENTS

| | | |
|---|---|---|
| 0 263 512 A2 | 4/1988 | European Pat. Off. . |
| 0 369 784 A2 | 5/1990 | European Pat. Off. . |
| 0 440 214 A2 | 8/1991 | European Pat. Off. . |
| 0 440 215 A2 | 8/1991 | European Pat. Off. . |
| 0 464 786 A2 | 1/1992 | European Pat. Off. . |
| 0 511 622 A2 | 11/1992 | European Pat. Off. . |
| 0 583 989 A2 | 2/1994 | European Pat. Off. . |
| 0 625 778 A2 | 11/1994 | European Pat. Off. . |
| 0 731451A2 | 9/1996 | European Pat. Off. . |
| 43 25 329A1 | 2/1994 | Germany . |
| 2-128317 | 5/1990 | Japan . |
| 2-128318 | 5/1990 | Japan . |

OTHER PUBLICATIONS

Registry of Patents, Search Report, Austrian Patent Office, dated Jun. 18, 1997.

*Primary Examiner*—Craig A. Renner
*Attorney, Agent, or Firm*—David G. Conlin; David A. Tucker; Dike, Bronstein, Roberts & Cushman, LLP

[57] ABSTRACT

A method for conducting data writing/reading-out utilizing a contact start and stop (CSS) system is provided. The system includes a magnetic disc having a data zone for writing/reading-out of data and a contact start and stop (CSS) zone having a taking-off/landing region, and a stopping region for contact start and stop operation of a magnetic head. A plurality of projections are provided in the CSS zone such that the relative height of the projections in the taking-off/landing region decreases in the radial outward direction from the center of the magnetic disc toward the data zone. An average gradient for the height of the projections in the taking-off/landing zone is between about $1\times10^{-6}$ and about $5\times10^{-5}$. Further, the maximum height of the projections in the CSS zone is greater than the flying height of the magnetic head in the data zone, and the minimum height of the projections in the CSS zone is lower than the flying height of the magnetic head in the data zone. The system also includes a contact-head for seeking and for spinning down/spinning up disc rotations on the sloped projections. Recording/reading operations are accomplished by flying the magnetic head at a height lower than the maximum height of the projections.

11 Claims, 3 Drawing Sheets

METHOD FOR DATA WRITING/READ-OUT USING A CONTACT START AND STOP SYSTEM

CROSS REFERENCE TO RELATED APPLICATION

This is a divisional application of U.S. patent application Ser. No. 09/080,361, filed Mar. 17, 1998, now abandoned by Arita et al. for "MAGNETIC DISC WITH PROJECTIONS IN A CONTACT START AND STOP ZONE", which in turn is a continuation-in-part of U.S. patent application Ser. No. 08/734,795, filed Oct. 23, 1996 now abandoned, by Arita et al. for "MAGNETIC DISC AND DATA WRITING/READING-OUT METHOD".

BACKGROUND OF THE INVENTION

The present invention relates to a magnetic disc and a data writing/reading-out method, and more specifically, to a magnetic disc for conducting data writing/reading-out by a contact start and stop (CSS) system, as well as a data writing/reading-out method.

Usually, writing and/or reading-out information to/from a magnetic disc is conducted by a magnetic head. In a hard disk drive, the magnetic disc is rotated at a high speed to fly the magnetic head. In the magnetic disc, mechanical polishing is applied substantially concentrically with a circumferential direction of a magnetic disc to form a fabrication trace (texture pattern) on the surface thereof (hereinafter referred to as "mechanical texture") for improving a magnetic characteristic. Usually, the mechanical texture is applied on the surface of a non-magnetic substrate or on an underlayer composed of Ni—P or Cr disposed on the substrate.

Along with the increasing of the amount of information, and the demand for miniaturizing and light-weightening the storage device, the linear recording density and the track density are increased, so that scratches caused by the existent mechanical texture result in an error at a high probability. Therefore, it has been proposed a method of applying the mechanical texture only in a zone where a contact start and stop operation is conducted (CSS zone) at the inner circumference of the magnetic disc while leaving a data recording zone (data zone or data writing zone) as it is. However, the surface of the data zone is made higher than that of the CSS zone, ad since it is difficult to moderate the difference between the data zone and CSS zone into a smooth inclination, there arises a problem that the magnetic head crushes upon seeking.

Further, a method of preparing a texture pattern by laser beam (laser texture) has also been proposed instead of the mechanical texture. For instance, U.S. Pat. Nos. 5,062,021 and 5,081,781 propose an attempt of locally melting a Ni—P layer by a Q switch laser beam of Nd—YAG having a very narrow pulse width and an very high energy density and forming a crater-like projection, thereby improving the CSS characteristic with respect to the magnetic head by the circular rim thereof.

According to the laser texture described above, the texturing can be applied only to the CSS zone of the magnetic recording medium. However, at least a certain height is required for the projections in the CSS zone in order not to cause sticking between the magnetic head and the disc, so that the glide height of the head is determined by the height of the projection. Accordingly, since the glide height of the recording medium is defined by the glide height in the CSS zone, the flying height of the head is excessive in the data zone to bring about a problem that the recording density can not be improved satisfactorily.

It is, accordingly, important in the data writing/reading-out method of a magnetic disc of the how the stable flying height of the magnetic head is lowered in the data zone or how sticking is suppressed at a stop position of the magnetic zone.

As a result of the present inventors' studies, it has been found that by using a disc drive having a magnetic head for writing/reading-out data from/to a magnetic disc, while flying the magnetic head at a predetermined flying height, which the magnetic disc comprising a contact start and stop (CSS) zone comprising a taking-off/landing region and a stopping region, for a contact start and stop operation of the magnetic head and a data zone for writing/reading-out data, wherein a plurality of projections are present in the CSS zone, the height of the projections in the taking-off/landing region decreases from inner to outer in a radial direction of the disc, an average gradient for the height of the projections in the taking-off/landing region is $1 \times 10^{-6}$ to $5 \times 10^{-5}$, the maximum height of the projections in the CSS zone is higher than a flying height of a magnetic head in the data zone, and the minimum height of the projections in the CSS zone is lower than the flying height of the magnetic head in the data zone, the magnetic head can conduct a stable CSS operation while seeking. The present invention has been attained on the basis of the finding.

SUMMARY OF THE INVENTION

An object of the present invention is to provide a magnetic disc for high density magnetic recording, and a data writing/reading-out method capable of fully utilizing the performance of the medium.

To accomplish the aim, in a first aspect of the present invention, there is provided a magnetic disc for conducting data writing/reading-out by a contact start and stop system (CSS), comprising a data zone for writing/reading-out data and a contact start and stop (CSS) zone comprising a taking-off/landing region and a stopping region, for a contact start and stop (CSS) operation of a magnetic head, wherein a plurality of projections are present in the CSS zone, the height of the projections in the taking-off/landing region lowers from the center of the magnetic disc toward the data zone in the radial direction, an average gradient for the height of the projections in the taking-off/landing region is $1 \times 10^{-6}$ to $5 \times 10^{-5}$, the maximum height of the projections in the CSS zone is higher than a flying height of the magnetic head in the data zone, and the minimum height of the projections in the CSS is lower than the flying height of the magnetic head in the data zone.

In a second aspect of the present invention, there is provided a method for conducting data writing/reading-out by a contact start and stop (CSS) system, which comprises:

using a magnetic disc comprising a data zone for writing/reading-out data and a contact start and stop (CSS) zone comprising a taking-off/landing region and a stopping region, for a contact start and stop (CSS) operation of a magnetic head, wherein a plurality of projections are present in the CSS zone, the height of the projections in the taking-off/landing region lowers from the center of the magnetic disc toward the data zone in the radial direction, an average gradient for the height of the projections in the taking-off/landing region is $1 \times 10^{-6}$ to $5 \times 10^{-5}$, the maximum height of the projections in the CSS zone is higher than a flying height of the magnetic head, and the minimum height of the projections in the CSS zone is lower than the flying height of the magnetic head, contact-head seeking and spinning down/spinning up a disc rotation on the sloped projections, and conducting a recording/reading operation by flying the magnetic head at a height lower than the maximum height of the projections.

DETAILED DESCRIPTION OF THE INVENTION

Figure 3:
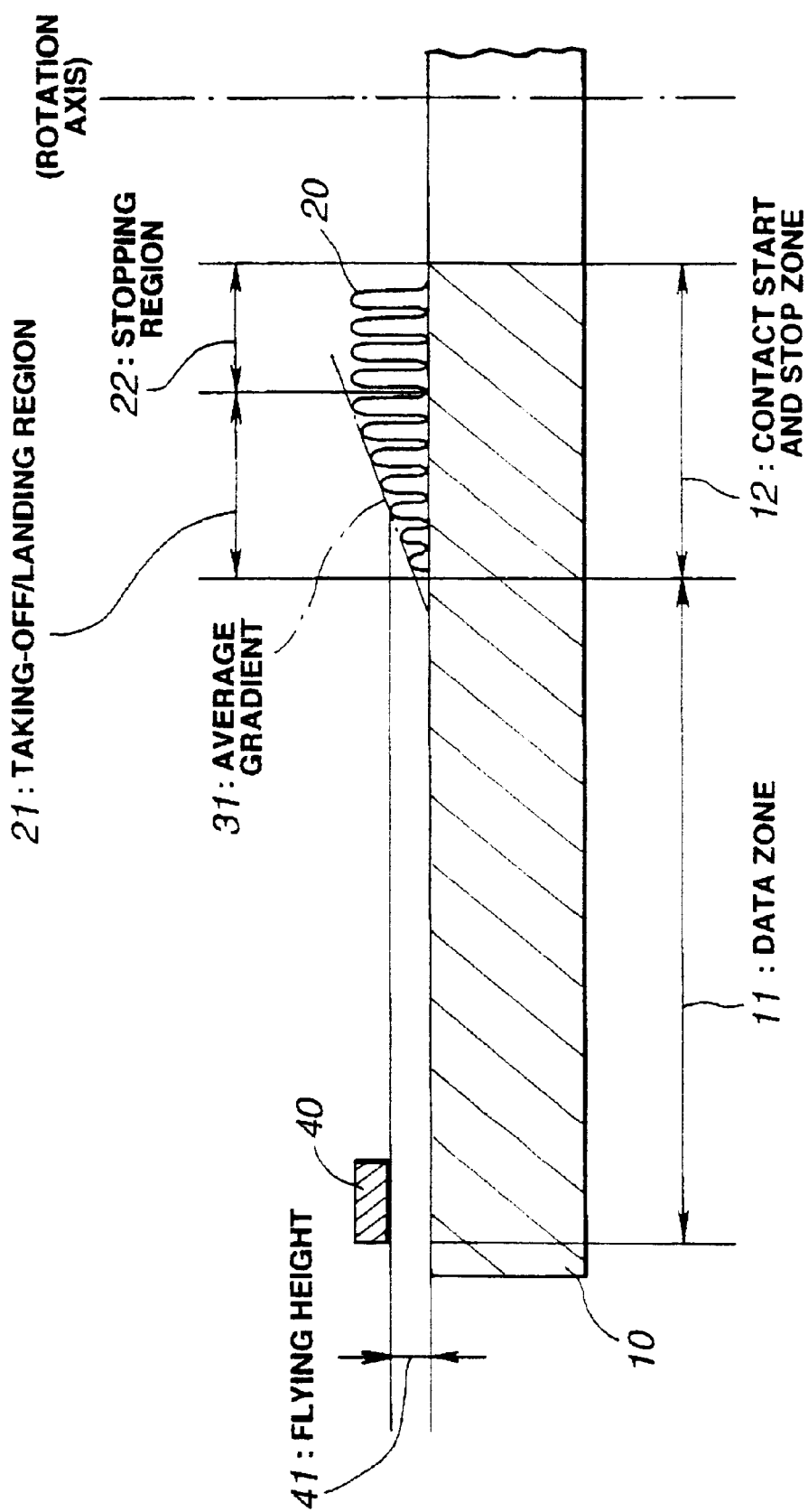
FIG. 3 is an explanatory view for a basic constitution of one embodiment of a magnetic disc.

The present invention will be explained specifically. A magnetic disc according to the present invention will at first be explained by using FIG. 3. The magnetic disc according to the present invention is a magnetic disc 10 which conducts data writing/reading-out by a contact start and stop (CSS) system. The magnetic disc 10 comprises data zone 11 and CSS zone 12 comprising a taking-off/landing region 21 and a stopping region 22. The magnetic disk 10 has a plurality of projections 20 satisfying specific conditions in the CSS zone 12. A magnetic head 40 moves over the disk 10 while keeping a flying height 41 and the CSS operation is conducted in the CSS zone 12. The height of the projections in the taking-off/landing region 21 lowers from the center of the magnetic disk toward the data zone 11 in the radial direction with an average gradient 31 for the height of the projections in the taking-off/landing region 21.

The magnetic disc comprises at least a magnetic layer, optionally by means of an underlayer and an intermediate layer thereon, on a non-magnetic substrate, and occasionally, a protective layer on the magnetic layer. The projections may be present to at least one of the substrate, the underlayer, the intermediate layer, the magnetic layer and the protective layer.

An aluminum alloy substrate, a glass substrate or a silicon substrate can be used suitably as the substrate, but a substrate composed of other metal such as copper and titanium, a carbon substrate, a ceramic substrate or resin substrate may also be used. For the silicon substrate, a pure silicon substrate as well as a silicon alloy substrate containing a trace amount of elements for increasing the strength may be used.

In case where the projection is formed by the irradiation of an energy beam such as laser, a material having a low reflectance on the surface and small heat diffusibility is suitable for the substrate in view of a relation between heat generation by irradiation and heat dissipation by thermal conduction. Further, a substrate polished flat as much as possible is used preferably in order to reduce a stable flying height on the data zone.

The magnetic recording medium can be obtained by forming the magnetic layer directly on the surface of the substrate, but the magnetic layer is usually formed by means of an underlayer formed on the surface of the substrate. As the underlayer, a non-magnetic underlayer composed of an Ni—P alloy is suitable and such an underlayer is formed usually by an electroless plating method or a sputtering method. The thickness of the underlayer is usually from 50 to 20,000 nm, preferably from 100 to 15,000 nm.

An intermediate layer such as a Cr layer or a Cu layer may be disposed between the substrate or the underlayer and the magnetic layer. The thickness of the intermediate layer is, usually, from 20 to 200 nm, preferably from 50 to 100 nm. The magnetic layer (magnetic recording layer) comprises a ferromagnetic thin alloy film such as composed of Co—P based alloy, Co—Ni—P based alloy, Co—Ni—Cr based alloy, Co—Ni—Pt based alloy, Co—Cr—Ta based alloy, Co—Cr—Pt based alloy or Co—Cr—Ta—Pt based alloy and is formed, for example, by electroless plating, electric plating, sputtering or vapor deposition (vacuum evaporation). The thickness of the magnetic recording layer is usually about from 30 to 70 nm.

A protective layer is usually disposed on the surface of the magnetic recording layer. The protective layer comprises a carbon film, a hydrogenated carbon film carbide film such as composed of TiC or SiC, a nitride film such as composed of SiN or TiN, or an oxide film such as composed of SiO, $Al_2O_3$ or ZrO, and is formed by a method, for example, vapor deposition (vacuum evaporation), sputtering, plasma CVD, ion plating and wetting process. As the protective layer, a carbonaceous film is preferred, with a hydrogenated carbon film or a carbon nitride film being particularly preferred.

Further, a lubricant layer is usually disposed on the surface of the protective layer. As the lubricant, for example, a liquid fluoro carbon-based lubricant is used suitably, and the lubricant layer is usually formed on the surface of the protective layer, for example, by a dipping method. However, in case of using a magnetic head having a diamond-like carbon layer on a slider surface, it is not always necessary for providing the protective layer or the lubricant layer since the tribologic property between the magnetic head and the magnetic recording medium is improved.

Figure 1:
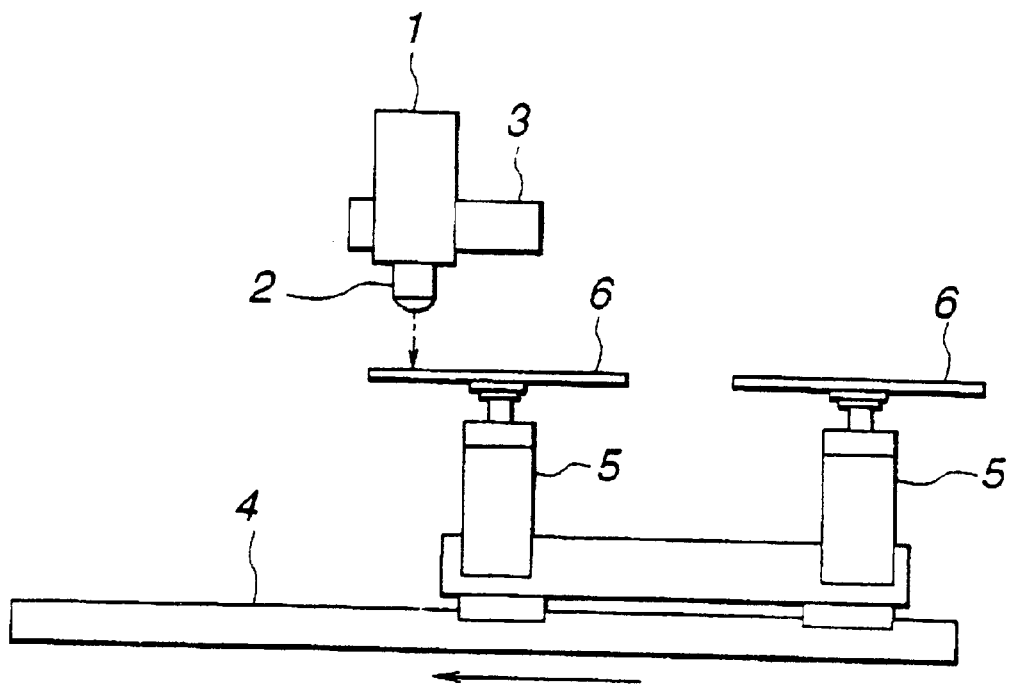
FIG. 1 is an explanatory view for a basic constitution of one embodiment of a laser beam irradiation device.

As a method of forming projections in the CSS zone where the magnetic head conducts the CSS operation, laser texturing using a laser beam irradiation device is adopted suitably. FIG. 1 is an explanatory view for the basic constitution of one embodiment of a laser beam irradiation device. The laser beam irradiation device exemplified in FIG. 1 mainly comprises a pulse laser beam generation means 1, a light condensing means 2, a spot moving means 3, a substrate moving means 4 and substrate rotating means 5, 5.

The pulse laser beam generation means 1 comprises, functionally, a laser beam generation means using a solid laser source and an optical modulation means for modulating the laser beam to form a pulse laser beam. In the drawing, reference numeral 6 represents a substrate. Although two substrate rotating means 5 are illustrated, the substrate rotating means may be disposed by any number.

As the light condensing means 2, any usual condensing means (objective lens) can be used so long as a desired fine spot is obtainable. The light condensing mechanism is used usually in combination with an autofocus (AF) system. For the spot moving means 3 and the substrate moving means 4, a linear slider, for example, is used suitably. The spot moving means 3 carries the pulse laser beam generation means 1 and the light condensing means 2 thereon, and moves integrally in a linear direction. The substrate moving means 4 carries the substrate rotating means 5 to be described later thereon and moves integrally the rotating means in a linear direction.

The spot moving means 3 has a function of continuously changing the position of the spot on the fabrication surface.

Such a positional change has a relative relation between the spot and the fabrication surface. Accordingly, it may suffice that the laser beam irradiation device shown in FIG. 1, has one of the spot moving means 3 or the substrate moving means 4. Usually, it is preferred to move the spot itself by the substrate moving means 4.

As the substrate rotating means 5, a spindle motor, for instance, is used suitably, and the substrate 6 is supported to a rotating shaft of the spindle motor and moved at a constant number of rotation or a constant linear velocity.

Figure 2A:
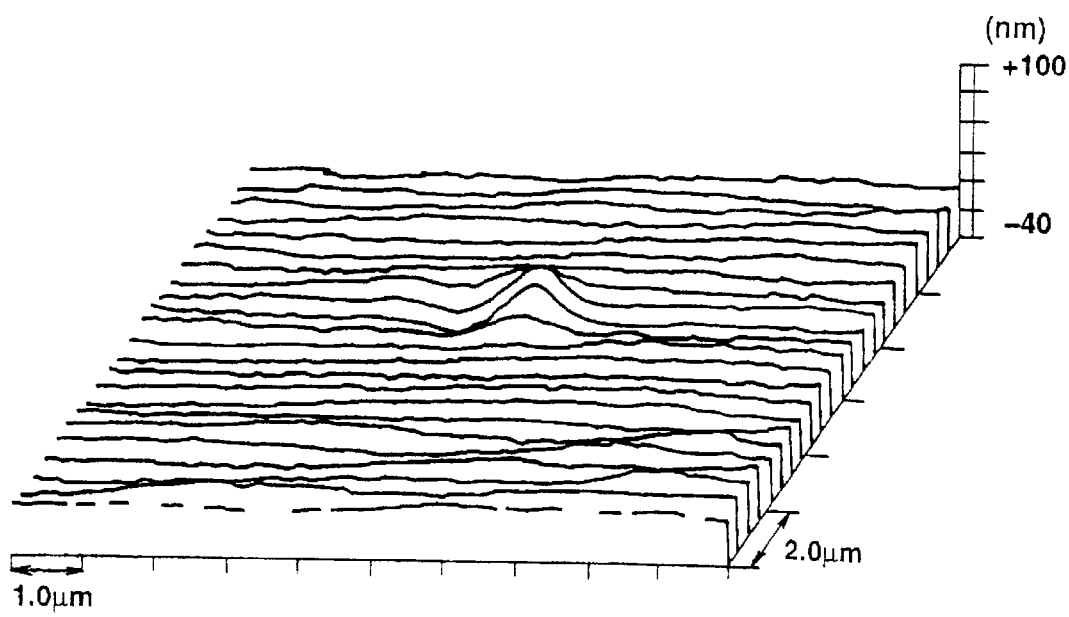
FIG. 2(a) is a perspective view illustrating the shape of a projection formed by laser texture in Example 1.
Figure 2B:
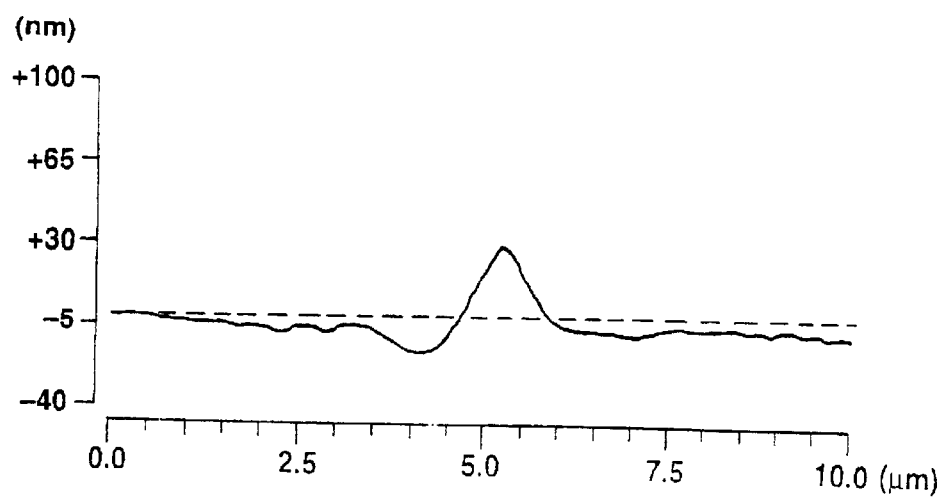
FIG. 2(b) is a vertical cross sectional view of a plane passing through the center of the projection obtained in Example 1 and including the scanning direction of a laser beam.

FIG. 2(a) is a perspective view illustrating the shape of a projection obtained in Example 1 by laser texture and FIG. 2(b) is a vertical cross sectional view along a plane passing through a center of the projection obtained in Example 1 and including a scanning direction of a laser beam. The mechanism of forming the projection by the laser texture has not yet been apparent at present but it may be assumed as below.

That is, a spot portion overheated locally on the projection-forming surface is melted partially and the molten portion is moved by the rotation of the substrate or the scanning of the laser beam. A portion initially irradiated by the beam causes a temperature gradient due to subsequent lowering of the temperature. Generally, since the surface tension is greater on the lower temperature side, the portion melted initially and then cooled to a lower temperature is protuberant by taking in a molten liquid from a portion melted subsequently due to the difference of the surface tension to form a shape of projection as shown in FIG. 2. Accordingly, a depression is formed in the finally molten portion. In this case, a depression is often present behind a convex projection in the scanning direction of the laser beam.

Further, the depression may be formed sometimes to the periphery of the projection by heat shrinkage depending on the conditions wherein the scanning speed of the laser beam or the rotating speed of the substrate is low, or the power of the laser beam is large. Although the phenomenon has not yet been analyzed sufficiently at present, it may be assumed as below. That is, since the locally heated spot portion expands but the periphery thereof is cooled and is less deformable, the expanded portion is directly cooled by an external air to remain as a projection. Then, the depression is formed by heat shrinkage at the periphery of the projection.

The height of the projection can be optionally controlled by adjusting the intensity of the laser beam, the average irradiation time and the linear velocity of the substrate. The density of the projections can be optionally controlled by adjusting the number of projections per one circumference, the irradiation interval of the pulse laser in the radial direction and the condition for controlling the height of the projection. The height of the projection denotes a height of a projection with reference to a center line for a roughness curve as defined by the surface roughness according to JIS (B0601-1982). Further, the density of the projections does not mean an average density over the entire medium but means a density of the projections per unit area in a region in which projections are present.

It is usually preferred that the intensity (power) of the laser is from 20 to 500 mW, the average irradiation time is from 0.05 to 100 $\mu$sec, the spot diameter of the laser is from 0.2 to 4 $\mu$m and the linear velocity of the substrate is from 0.8 to 15 m/sec. However, in a case of forming the spiral projection in the form of a mountain chain, the laser beam is caused to oscillate continuously while scanning the laser beam in a radial direction.

In the magnetic disc according to the present invention, a plurality of projections are present in the CSS zone comprising a taking-off/landing region and a stopping region, wherein the height of the projections in the taking-off/landing region lowers from the center of the magnetic disc toward the data zone in the radial direction, an average gradient for the height of the projections in the taking-off/landing region is $1\times10^{-6}$ to $5\times10^{-5}$, preferably $5\times10^{-6}$ to $2\times10^{-5}$, the maximum height of the projections in the contact start and stop zone is higher than a flying height of the magnetic head in the data zone, and the minimum height of the projections in the contact start and stop zone is lower than the flying height of the magnetic head in the data zone, [where the average gradient=(the difference between the projection height of projection present at a nearest position of the CSS zone to a magnetic disc center in the radial direction and the projection height of projection present at a nearest position of the CSS zone to the data zone in the radial direction)/(width of the CSS zone)]. The upper limit of the flying height of the magnetic head according to the present invention is preferably 60 nm and the lower limit of the flying height of the magnetic head according to the present invention is preferably 1 nm.

It is preferred that in a stopping region (for example, about 1 mm) of the magnetic head present in the CSS zone in the radial direction, which stopping region is a nearer region in the CSS zone to the magnetic disc center, the height of the projections therein lowers from the enter of the magnetic disc toward the data zone in the radial direction, the maximum projection height of the projection is not more than 200 nm, preferably from 20 to 50 nm, the projection density is from 10 to $10^6$ N/mm$^2$ and an average gradient for the height of the projections in the CSS zone is $5\times10^{-6}$ to $2\times10^{-5}$. Further, in order for smooth landing and rising of the magnetic head in a seeking state, the average gradient of the projection height in the stopping region is preferably $5\times10^6$ to $2\times10^{-5}$.

It is preferred that the average gradient for the height of the projections in the stopping region is equal to the average gradient for the height of the projections in the taking-off/landing region, and a declivity of the height of the projections in the stopping region and the taking-off/landing region is continuous. Also, it is preferred that the height of the projections in the stopping region is flat at a maximum height of the projections in the taking-off/landing region.

It is preferred that the magnetic disc according to the present invention has a plurality of projections formed by the scanning of the energy beam in the CSS zone, wherein the average height of the projections present in the concyclic (same track) in the CSS zone is from 1 to 60 nm, the projection density is from 10 to $10^8$ (N/mm$^2$) and the average area of a figure (cross sectional area) surrounded with a contour line at a height 1 nm below the top of each of the projections (hereinafter referred to as "contour line area") is more than 0 $\mu$m$^2$ to not more than 1 $\mu$m$^2$, and the vertical cross sectional shape of a plane passing through the center of each of the said formed projections and including the scanning direction of the energy beam has a depression on one side at the bottom of each of the said formed projections.

If the average height of the projections present in the concyclic (same track) in the CSS zone exceeds 60 nm, a CSS characteristic may be satisfactory but the stable flying height of the head may not be lowered. On the contrary, if the average height of the projections present in the concyclic (same track) in the CSS zone is less than 1 nm, the projection may be buried in a fine unevenness inherent to the substrate, whereby it may become difficult to obtain an intended effect. Further, if the density of the projection is not more than 10 ($N/mm^2$), it becomes difficult to support the lower surface of the magnetic head only by the projection because of undulation or the like of the substrate. On the other hand, if the density of the projection exceed $10^8$ ($N/mm^2$), it becomes difficult to make the height of the projection uniform. If the contour line area exceeds 1 $\mu m^2$, sticking tends to occur relative to the magnetic recording medium and the magnetic head tends to lower the CSS characteristic.

The contour line area can be calculated from the bearing ratio of the projections measured by a three dimensional surface structure analyzing microscope (trade name: "ZYGO" manufactured by ZYGO CORP. in U.S.A.) or an atomic force microscope (ATM). Since the projection height formed by the laser irradiation is almost uniform, a value calculated from the bearing ratio of one projection selected optionally may represent the contour line area. But, it is preferred for obtaining the value in high accuracy to use the average value calculated from the bearing ratios of plurality projections measured.

It is essential that the magnetic disc according to the present invention has projections in the CSS zone where the magnetic head conducts the CSS operation, wherein the height of the projection is lowered toward the data zone. In a case of using such a magnetic disc, when the magnetic recording device stays stationary, the magnetic head is placed at a portion of the CSS zone where the height of the projection is high with less sticking. Then, when a driving device is started, the magnetic head moves to a portion of the CSS zone where the height of the projections is lower accompanying the rotation of the disc. This portion causes sticking when the magnetic head stops on the magnetic disc, but frictional force in the state of sliding movement is designed small enough. Further, since the projection density is high, it is excellent in wear resistance. When the number of rotation of the medium reaches a predetermined high speed rotation, the magnetic head completely leaves the medium and can freely move on the data zone.

Further, assuming the standard deviation for the height of the projections present in an optional radial region of 50 $\mu m$ width on the magnetic disc as $\sigma$, it is preferred that the magnetic disc of the present invention has a value $2\sigma$ ($2\times\sigma$) of not more than 15%. That is, it is preferred that the height of the projection on the surface of the magnetic disc less scatters and a more preferred value $2\sigma$ is within 10%.

Further, for the magnetic disc according to the present invention, a magnetic disc in which the projection density at the taking-off/landing region (landing region) of the magnetic head is higher than the projection density at the stopping region of the magnetic head, is used preferably. Such a magnetic disc is preferred since the abrasion for the portion of projections upon CSS operation can be reduced. Usually, the ratio of the projection density at an optional position in a region with 1 mm width from the data zone in the contact start and stop zone in the radial direction to the projection density at an optional position in the region (stopping region) with 1 mm width on the inside from the nearest position of the contact start and stop zone to a magnetic disc center in the radial direction is more than 1 to not more than 100, preferably more than 1.2 to not more than 20, more preferably 2 to 10.

Description will then be made to a data writing/reading-out method according to the present invention.

In the data writing/reading-out method according to the present invention, the reading-out/writing of data by the magnetic head to the magnetic disc is conducted by the CSS system. In the method according to the present invention, a disc used has projections in a CSS zone where a magnetic head conducts a CSS operation, and the writing/reading is conducted by flying the magnetic head at a height lower than the maximum projection height of the projections. Then, the magnetic disc according to the present invention described previously is used suitably for such operation.

Usually, the ratio of the height (Hs) for the stopping region of the magnetic head in the CSS zone to the flying height (Hf) of the magnetic head in the data zone is defined within a range from more than 1 to not less than 100, preferably from more than 1 to not less than 50, more preferably from more than 1 to not less than 10. The values for Hs and Hf can be determined by measurement by a glide tester, using the standard bump disc having a standard height.

Then, as described previously, in the present invention, it is preferred that the magnetic head conducts the CSS operation while seeking. That is, when the magnetic head conducts the CSS operation, the magnetic head is caused to rise and land at the inclined portion of the projection while seeking. Actually, when the magnetic disc stops stationary, the magnetic head is moved to a higher portion of the projection height accompanying the lowering of the rotational velocity while seeking, and the rotation of the magnetic disc is stopped at the final stationary position of the magnetic head.

During driving of the magnetic recording device, if the magnetic head does not conduct seeking on the data zone, the magnetic head preferably stands-by in the CSS zone where the height of the projection is lower for emergency of power source abnormality or the like. Accordingly, it is preferred that the CSS zone of lower projection height has a glide height substantially equal with that of the data zone. When the magnetic head at first lands, while seeking, at the inclined of the CSS zone where the height of the projection is gradually increased, and then moves to a portion where the projection height is higher accompanying lowering of the number of rotation of the magnetic disc.

In the magnetic disc according to the present invention, since convex projections are present in a CSS zone where the magnetic head conducts a CSS operation, the height of the projection is reduced toward the data zone, the inclination of the projection is small enough at a portion in contact with a magnetic head at a high speed, and the projection density is large at a portion in contact with a magnetic head at a high speed, the magnetic head can conduct a stable CSS operation while seeking.

In addition, since the magnetic head is moved accompanying a low speed rotation of the medium and a final stopping region of the magnetic head is a portion of convex projection of high projection height, the sticking is not caused upon stopping of the magnetic head. Accordingly, when the magnetic head seeks the data zone, since the flying height can be reduced as low as possible and the magnetic head can be placed on a sufficiently high projection upon stopping, a high density magnetic recording device can be developed by adopting quite the same method as usual CSS operation.

In summary, in accordance with the present invention, there is provided a data writing/reading-out method capable of improving the sticking characteristic of the magnetic head to the surface of the medium and reducing the flying height of the magnetic head as low as possible in a data zone, while maintaining a satisfactory CSS characteristic.

EXAMPLES

The present invention will be described more in details by way of examples but the present invention is not restricted only to the following examples unless the gist of the invention is not exceeded.

Example 1 and Comparative Examples 1–2

An Al substrate of 90 mm in diameter coated with an Ni—P underlayer was polished by applying a circumferential mechanical texture to reduce the surface roughness (Ra) in data and CSS zones to not more than 1 nm.

Then, an argon pulse laser (at 488 nm) controlled at a high accuracy to the intensity described in Table 1 to Table 3 was irradiated to a CSS zone of the Ni—P layer to form projections, such that the height was lowered toward the data zone successively. The projection density was increase in a portion for the projection height in the CSS zone corresponding to the flying height of the magnetic head. Irradiation conditions and the height of the projection at each radius are shown in Tables 1 to 3. Numerical aperture (NA) of objective lenses are shown in the tables. A spot diameter in which 84% of energy is concentrated is represented as 1.22×k/NA. Further, the cross sectional area of the projection represents a cross sectional area at a portion 1 nm below the top end of the projection.

Next, a Cr intermediate layer (100 nm), a Co—Cr—Ta alloy magnetic film (50 nm) and a carbon protective film (50 nm) were formed successively on the substrate by sputtering method and then a fluorine-based liquid lubricant ("DOL-2000", manufactured by Monte Edison Co.) was coated to a thickness of 2 nm by a dipping method, to obtain a magnetic disc.

The contour line area were calculated as follows. The cross sectional areas surrounded with a contour line at a height 1 nm below the top of each of eight projections formed by the same condition were measured by a three dimensional surface structure analyzing microscope (trade name: "ZYGO" manufactured by ZYGO CORP in U.S.A.). The average area was calculated from the measured areas and is shown in Tables 1 and 3 as "cross sectional area of projection".

For the magnetic disc thus manufactured, the static friction coefficient before CSS test (initial sticksion) and frictional force after 20,000 cycles of CSS were measured. The results are shown in Table 4. In the CSS test, a thin film head with 6 gf of load gram (slider material; $Al_2O_3$ TiC) was used and measurement was conducted under the condition of a head flying height of 0.8 μinch. Further, the stable flying height (glide height) of the magnetic head was evaluated in the data zone by using a glide tester. The magnetic disc of Comparative Example 1 had a glide height of 1.5 μinch, while the magnetic disc of Comparative Example 2 has a glide height of 0.7 μinch in the CSS zone.

Tables 1 to 3 show characteristic values of the magnetic discs and Table 4 shows the results of the CSS test. In Table 1, "r" represents a distance from the center of the magnetic disc in which r=18–21 mm is a CSS zone (3 mm). The standard deviation value 2σ in Table 1 represents a value 2σ (%) assuming the standard deviation as σ. In Tables 1 to 3, the projection density (1) represents a density of projection at an optional position in a region with 1 mm width from the boundary region neighboring the data zone, and the projection density (2) represents a density of projection at an optional position, in a region, with, in the radial direction, 1 mm width from the innermost circumference of the CSS zone.

TABLE 1

| | Example 1 | | |
|---|---|---|---|
| | r = 21~20 mm | r = 20~19 mm | r = 19~18 mm |
| Linear velocity of substrate (mm/sec) | 1714 | 1714 | 1714 |
| Laser intensity (mW) | 220 | 220 | 220 |
| Average irradiation time (μsec) | 0.32~0.64 | 0.064~0.96 | 0.96~1.23 |
| Projection density (1) (N/mm$^2$) | 18520 | 9260 | 9260 |
| Projection height (nm) | 6~15 | 15~22 | 25~35 |
| Cross sectional area of projection (μm$^2$) | 0.43~0.39 | 0.39~0.23 | 0.23~0.10 |
| Numeral aperture of objective lens | 0.6 | 0.6 | 0.6 |
| Standard deviation (2σ) (%) | 9.5 | 10 | 6.7 |

TABLE 2

| | Example 1 |
|---|---|
| Hs (μinch) | 1.5 |
| Gradient of height of entire projection for CSS zone | 9.7 × 10$^{-6}$ |
| Hf (μinch) | 0.8 |
| Projection density (2) (N/mm$^2$) | 9260 |
| Projection density ratio (1)/(2) | 2 |

TABLE 3

| | Comparative Example 1 | Comparative Example 2 |
|---|---|---|
| Linear velocity of substrate (mm/sec) | 1714 | 1714 |
| Laser intensity (mW) | 220 | 220 |
| Average irradiation time (μsec) | 1.28 | 0.32 |
| Projection density (1) (N/mm$^2$) | 9260 | 9260 |
| Projection height (nm) | 35 | 6 |
| Cross sectional area of projection (μm$^2$) | 0.10 | 0.48 |
| Numeral aperture of objective lens | 0.6 | 0.6 |
| Hs (μinch) | — | — |
| Entire gradient for CSS zone | 0 | 0 |
| Gradient for CSS zone (maximum/boundary) | 0 | 0 |
| Hf (μinch) | 1.5 | 0.7 |
| Projection density (2) (N/mm$^2$) | 9260 | 9260 |
| Projection density ratio (1)/(2) | 1 | 1 |

TABLE 4

| | Example 1 | Comparative Example 1 | Comparative Example 2 |
|---|---|---|---|
| Initial sticksion (friction coefficient) | 0.15 | 0.14 | 5.19 |
| Frictional force after 20,000 cycles of CSS (gf) | 3 | (Note 1) | (Note 2) |

(Note 1): Head crushed
(Note 2): Driving stopped by adsorption (at 400 cycles)

In Example 1, since the magnetic head conducts a CSS operation while seeking, the bottom of the magnetic head is in contact with the inclined surface of projections at a radial portion from 21 to 20 mm and projection height from 5 to 15 nm, and moves as it is toward the higher portion of the projection height. Since the initial landing portion has a high projection density and a sufficient abrasion resistance even when the magnetic head moves slidably at a high speed. Further, since the gradient of the projection height is small enough, no head crushing is caused also in initial contact with the magnetic head.

The sticksion and the frictional force after 20,000 cycles in Example 1 are values at the final magnetic head stopping region at a 19 to 18 mm radial region, and the seeking velocity of the magnetic head in the CSS zone was defined as 1 mm/sec in the radial direction. On the contrary in the CSS zone of Comparative Example 1, since there is no gradient for the projection height and the projection height is higher than the flying height of the magnetic head in the data zone, head crushing was caused after several cycles of the CSS operation. Further, in the CSS zone of Comparative Example 2, although no head crushing was caused upon seeking of the magnetic head, since the projection height is low, sticking was caused after repeating the CSS operation or upon stopping of the magnetic head and the magnetic head could move no more.

What is claimed is:

1. A method for conducting data writing/reading-out by a contact start and stop system, which comprises:

using a magnetic disc comprising a data zone for writing/reading-out data and a contact start and stop zone comprising a taking-off/landing region and a stopping region, for a contact start and stop operation of a magnetic head, wherein a plurality of projections are present in the contact start and stop zone, the height of the projections in the taking-off/landing region lowers from the center of the magnetic disc toward the data zone in the radial direction, an average gradient for the height of the projections in the taking-off/landing region is $1 \times 10^{-6}$ to $5 \times 10^{-5}$, the maximum height of the projections in the contact start and stop zone is higher than a flying height of the magnetic head, and the minimum height of the projections in the contact start and stop zone is lower than the flying height of the magnetic head, contact-head seeking and spinning down/spinning up a disc rotation on the sloped projections, and conducting recording/reading operation by flying the magnetic head at a height lower than the maximum height of the projections.

2. A data writing/read-out method according to claim 1, which comprises using a magnetic disc in which an average height of the projections present in a same track in the contact start and stop zone is from 1 to 60 nm, a projection density is from 10 to $10^8$ N/mm$^2$, and an average area of a cross sectional area surrounded with a contour line at a height 1 nm below the top of each of the projections is more than 0 $\mu$m$^2$ to not more than 1 $\mu$m$^2$.

3. A data writing/reading-out method according to claim 1, which comprises using a magnetic disc in which the projections are formed by scanning of an energy beam, and a vertical cross sectional shape of a plane passing through the center of each of said formed projections and including the scanning direction of the energy beam has a depression on one side at the bottom of each of said formed projections.

4. A data writing/reading-out method according to claim 1, which comprises using a magnetic disc in which the average gradient for the height of the projections in the taking-off/landing region is $5 \times 10^{-6}$ to $2 \times 10^{-5}$.

5. A data writing/reading-out method according to claim 1, which comprises using a magnetic disc in which a twice value of standard deviation for the height of the projections present in an optional radial region of 50 $\mu$m width on the magnetic disc is within 15%.

6. A data writing/reading-out method according to claim 1, which comprises using a magnetic disc in which the projection density at the taking-off/landing region for the magnetic head is made higher compared with the projection density at the stopping region for the magnetic head.

7. A data writing/reading-out method according to claim 1, which comprises using a magnetic disc in which an average gradient for the height of the projections in the stopping region is equal to the average gradient for the height of the projections in the taking-off/landing region, and a declivity of the height of the projections in the stopping region and the taking-off/landing region is continuous.

8. A data writing/reading-out method according to claim 1, which comprises using a magnetic disc in which the height of the projections in the stopping region is flat at a maximum height of the projections in the taking-off/landing region.

9. A data writing/reading-out method according to claim 1, which comprises using a magnetic disc in which a ratio of the projection density at an optional position in a region with 1 mm width from the data zone in the contact start and stop zone in the radial direction to the projection density at an optional position in a region with 1 mm width on the inside from the nearest position of the contact start and stop zone to a magnetic disc center in the radial direction is more than 1 to not more than 100.

10. A data writing/read-out method according to claim 1, wherein when the magnetic disc stops stationary, the magnetic head is moved to a higher portion of the projection height accompanying the lowering of the rotational velocity while seeking, and the rotation of the magnetic disc is stopped at a final stationary position of the magnetic head.

11. A data writing/reading-out method according to claim 1, wherein the ratio of the height for the stopping region of the magnetic head in the contact start and stop zone to the flying height of the magnetic head in the data zone is more than 1 to not more than 100.

* * * * *